(12) United States Patent
d'Haene

(10) Patent No.: US 10,442,561 B2
(45) Date of Patent: Oct. 15, 2019

(54) WRAPPING DEVICE AND METHOD FOR WRAPPING BALES BY MEANS OF SUCH A DEVICE

(71) Applicant: Valvan Baling Systems NV, Menen (BE)

(72) Inventor: Steven d'Haene, Menen (BE)

(73) Assignee: Valvan Baling Systems NV, Menen (BE)

(*) Notice: Subject to any disclaimer, the term of this patent is extended or adjusted under 35 U.S.C. 154(b) by 595 days.

(21) Appl. No.: 15/107,608

(22) PCT Filed: Jan. 28, 2015

(86) PCT No.: PCT/IB2015/050642
§ 371 (c)(1),
(2) Date: Jun. 23, 2016

(87) PCT Pub. No.: WO2015/114532
PCT Pub. Date: Aug. 6, 2015

(65) Prior Publication Data
US 2016/0318640 A1    Nov. 3, 2016

(30) Foreign Application Priority Data
Jan. 28, 2014    (BE) .................... 2014/0044

(51) Int. Cl.
*B65B 27/12*    (2006.01)
*B65B 11/02*    (2006.01)
(Continued)

(52) U.S. Cl.
CPC .......... *B65B 27/125* (2013.01); *A01F 15/071* (2013.01); *B65B 11/025* (2013.01);
(Continued)

(58) Field of Classification Search
CPC ....... B65B 11/025; B65B 11/10; B65B 41/16; B65B 61/06; B65B 11/00; B65B 11/02;
(Continued)

(56) References Cited

U.S. PATENT DOCUMENTS 4,409,776 A * 10/1983 Usui ..................... B65B 11/045
493/112
4,723,393 A * 2/1988 Silbernagel ............. B65B 11/58
53/210
(Continued)

FOREIGN PATENT DOCUMENTS

| DE | 3311279 A1 | 10/1984 |
|----|------------|---------|
| EP | 1386532 A1 | 2/2004 |
| WO | 2005012098 A1 | 2/2005 |

*Primary Examiner* — Andrew M Tecco
*Assistant Examiner* — Nicholas E Igbokwe
(74) *Attorney, Agent, or Firm* — James Creighton Wray

(57) ABSTRACT

The present invention relates to a wrapping device (1) configured to wrap a bale (12) with a wrapping material (2), wherein the device (1) comprises a wrapping unit (3) which is rotatable clockwise and counterclockwise and which is configured to wrap part of the bale by rotating the wrapping unit (3) counterclockwise around the bale and to wrap another part of the bale by rotating the wrapping unit (3) clockwise around the bale. By means of such a device, it is possible to wrap a bale without using a welding device. By means of such a device, it is also possible to use not readily weldable wrapping material (such as e.g. tape fabric made from PP or PE).

13 Claims, 3 Drawing Sheets

(51) Int. Cl.
   *B65B 13/02* (2006.01)
   *B65B 41/16* (2006.01)
   *B65B 61/06* (2006.01)
   *A01F 15/07* (2006.01)
   *B65B 11/10* (2006.01)

(52) U.S. Cl.
   CPC .............. *B65B 11/10* (2013.01); *B65B 13/02* (2013.01); *B65B 41/16* (2013.01); *B65B 61/06* (2013.01)

(58) Field of Classification Search
   CPC ......... B65B 11/58; B65B 13/02; B65B 13/20; B65B 2210/20; A01F 15/071
   USPC ............... 53/397, 465, 523, 529, 210, 389.3
   See application file for complete search history.

(56) References Cited

U.S. PATENT DOCUMENTS

| | | | | |
|---|---|---|---|---|
| 5,107,657 | A * | 4/1992 | Diehl | B65B 11/006 53/141 |
| 5,327,706 | A * | 7/1994 | Skole | A01F 15/071 53/211 |
| 5,423,163 | A * | 6/1995 | Wendt | B65B 11/025 53/556 |
| 5,452,566 | A * | 9/1995 | Benhamou | B65B 11/025 53/389.3 |
| 5,531,393 | A * | 7/1996 | Salzsauler | B29C 55/06 242/160.4 |
| 5,564,258 | A * | 10/1996 | Jones, Sr. | B65B 11/008 53/399 |
| 5,749,206 | A * | 5/1998 | Moore | B65B 11/025 53/556 |
| 5,996,315 | A * | 12/1999 | Scherer | B65B 11/04 53/210 |
| 2003/0110737 | A1* | 6/2003 | Lancaster, III | B65B 11/008 53/441 |
| 2004/0250696 | A1* | 12/2004 | Gualchierani | B30B 9/3003 100/15 |
| 2011/0197548 | A1* | 8/2011 | Bauer | A01F 15/071 53/203 |

\* cited by examiner

WRAPPING DEVICE AND METHOD FOR WRAPPING BALES BY MEANS OF SUCH A DEVICE

This application claims the benefit of Belgian Application No. 2014/0044 filed Jan. 28, 2014, and PCT/IB2015/050642 filed Jan. 28, 2015, International Publication No. WO 2015/114531 A1, which are hereby incorporated by reference in their entirety as if fully set forth herein.

The present invention relates, on the one hand, to a wrapping device configured to wrap a bale with a wrapping material comprising a wrapping unit which is rotatable clockwise and counterclockwise. The invention relates in particular to a wrapping device configured to wrap the (four) upright surfaces of a bale.

On the other hand, the present invention relates to a method for wrapping bales by means of such a wrapping device.

The present invention also relates to a bale-pressing device configured to successively form bales, comprising a pressing station for pressing a bale, and a wrapping device according to the invention for wrapping the formed bale.

Presses in which the supplied material is pressed vertically into a chamber, following which the bale is freed by removing the chamber or by pushing the bale out of the chamber, are known per se and exist in different embodiments. Using a pressure force of between 50 and 5000 kN, such bale-pressing devices automatically or semi-automatically compress a compressible material, such as e.g. natural and synthetic fibres, paper, cardboard, foam, plastic, and the like, to form bales.

In order to prevent loss of material and/or pollution of the pressed material, to maintain the dimensional stability of the bale and to protect the bale from e.g. moisture, the bales are provided with a wrapping material after compression. This may be a sheet material which is for example made of cardboard, but may also be a flexible material, such as e.g. a plastic film or fabric. Wrapping may be carried out manually or automatically.

After wrapping, the formed bales may be tied up manually or automatically by means of, for example, a strap-shaped or wire-shaped material which may be made from iron, steel or plastic.

Currently, systems are already known to automatically wrap the formed bales. In this case, the top and bottom surface of the formed bale are first provided with a top and bottom sheet respectively. Subsequently, the four (upright) lateral surfaces of the bale are provided with a so-called intermediate sheet. With existing systems, the intermediate sheet is formed by two strips of packaging material, each of which covers a part of the bale and which are connected to each other via a welding operation. To this end, a separate roll with a weldable wrapping material is arranged on either side of the outlet of the pressing station.

A first drawback of the abovementioned wrapping system is the fact that the intermediate sheet is not arranged tightly around the bale, as a result of which the top and bottom sheet may become loose. In addition, this way of wrapping is only suitable for use with weldable wrapping materials, such as for example polyethylene.

According to another system, the punch is rotated through 360°, together with the pressed bale. During the rotating movement, the wrapping material is arranged against the upright surfaces of the bale. However, this embodiment is technically difficult to realize.

Yet another way of wrapping is described in International patent application WO 2005/012098. In this publication, use is made of a wrapping unit which is rotatable clockwise and counterclockwise to wrap a part of the bale by rotating the wrapping unit counterclockwise around the bale.

As the patent proprietor is considering the option of switching to woven polypropylene as wrapping material, which is difficult to weld as such, it is, inter alia, an object of the present invention to provide a wrapping device which permits the user to choose freely which wrapping material he wants to use. Another object of the present invention is to provide a wrapping device and a method which makes it possible to arrange an intermediate sheet around a bale quickly and without requiring a separate welding operation.

The object of the invention is achieved by providing a wrapping device for wrapping a bale with a wrapping material, wherein the device comprises a wrapping unit which is rotatable clockwise and counterclockwise and which is configured to wrap part of the bale by rotating the wrapping unit counterclockwise around the bale and to wrap another part of the bale by rotating the wrapping unit clockwise around the bale.

Such a wrapping device has the advantage that it makes it possible to wrap a bale, in particular the upright surfaces thereof, using one strip of wrapping material, so that no separate welding operation is required anymore, and thus no separate welding unit has to be provided anymore. The absence of such a welding unit will lower the cost price of the installation, reduce maintenance and increase efficiency. In addition, it will be possible to wrap bales more quickly by means of such a wrapping device. Furthermore, this also permits the use of non-weldable materials for wrapping bales. The wrapping material used is preferably tape fabric made from polypropylene or polyethylene. However, it is also still possible to use a weldable wrapping material for wrapping, such as preferably polyethylene.

The wrapping device according to the invention is particularly suitable for wrapping bales originating from a so-called 'high-capacity bale-pressing device'. Such devices compress from 15 to 20 bales per hour.

In a preferred embodiment of the wrapping device according to the invention, the wrapping unit comprises guide means which are configured to guide the wrapping material through the wrapping unit during rotation of the wrapping unit around the bale. The guide means (in combination with the rotatable roll holder) ensure that the wrapping material is wrapped tightly around the bale during the rotating movement.

According to a preferred embodiment of the wrapping device according to the invention, the axis of rotation of the rotatable wrapping unit coincides, during use, with the centre line of the bale to be wrapped.

According to a more preferred embodiment of the wrapping device according to the invention, the rotatable wrapping unit is rotatable counterclockwise at least between a starting position and a dispensing position, and is rotatable clockwise between the dispensing position and an end position. During the rotation of the wrapping unit between the dispensing position and the end position, it will pass the starting position. After it has finished the wrapping cycle, the wrapping unit will return to its starting position by rotating counterclockwise. Obviously, in an alternative embodiment, the above-described direction of rotation of the wrapping unit may be reversed because of e.g. the position of the wrapping unit, and consequently, the rotatable wrapping unit is then rotatable clockwise at least between a starting position and a dispensing position, and is rotatable counterclockwise between the dispensing position and an end position. During rotation of the wrapping unit between the dispensing position and the end position, it will pass the starting position. After it has finished the wrapping cycle, the wrapping unit will return to its starting position by rotating clockwise.

In a more particular embodiment of the wrapping device according to the invention, the rotatable wrapping unit comprises one or more clamping elements to carry the wrapping material along during rotation of the wrapping unit between the starting and dispensing position.

During rotation of the wrapping unit between the starting and dispensing position, the two upright surfaces, in particular the rear surface and the one (left-hand) lateral surface, of the formed bale will be provided with wrapping material. Now, in order to be able to provide the front surface of wrapping material, the wrapping device, in a most particular embodiment, furthermore comprises a linearly movable carriage configured to grip the wrapping material at the location of the dispensing position and carry it along in the direction of the end position of the rotatable wrapping unit in order to wrap part of the bale. Preferably, the movable carriage is furthermore configured to release the wrapping material which was carried along at the location of the end position. After the wrapping material has been released, on the one hand, the wrapping material is pressed against the bale, preferably via pressure means which, in principle, form part of the bale-pressing device. On the other hand, said carriage will move back to the dispensing position in order to be ready to grip a new strip of wrapping material during wrapping of a subsequent bale. In a particular embodiment, the movable carriage may form part of a tying-up device which is configured to tie up the wrapped bale.

The other (right-hand) lateral surface which is not yet covered is provided with wrapping material during the rotation of the wrapping unit clockwise between the dispensing position and an end position. During the rotating movement of the wrapping unit, the wrapping material continues to move through this wrapping unit. During this rotating movement, the wrapping unit passes the starting position. At the location of the starting position, the wrapping unit will tension the wrapping material, as a result of which it will be carried along in the direction of the end position and, in this way, will cover the right-hand lateral surface.

In an advantageous embodiment of the wrapping device according to the invention, the wrapping device comprises a rotatable roll holder configured to receive a roll of wrapping material, wherein said roll holder is drivable and configured to keep the wrapping material tensioned during wrapping of the bale. Due to the fact that the material is continually tensioned during rotation of the wrapping unit, and thus during wrapping of the bale, the wrapping material, once applied, remains fitted tightly around the bale. The drive of the roll holder works according to the principle of constant torque control. The roll holder is arranged in a fixed position, i.e. it remains in the same position during wrapping of the bale. In an alternative embodiment, the roll holder is arranged horizontally and in a fixed position. An obliquely (45°) arranged shaft ensures that the wrapping material is turned from horizontal to vertical. In this case, the wrapping material is kept under tension by a dancing roller. An advantage of this system may be that the dancing roller ensures that an amount of wrapping material is accumulated, so that the roll holder only has to unroll, and therefore not roll up, wrapping material.

In a preferred embodiment of the wrapping device according to the invention, the guide means comprise one or more guide rollers for guiding the wrapping material.

According to a particular embodiment, the rotatable wrapping unit comprises a cutting device for cutting the wrapping material. The wrapping material will be cut after the bale has been covered. More particularly, at the location of its end position, the rotatable wrapping unit is movable between the end position and a cutting position. Preferably, the wrapping unit will move between the end position and cutting position by means of a tilting movement about a vertical axis or by executing a linear movement.

Due to the fact that the wrapping unit performs a tilting or linear movement, the wrapping material is pressed tightly against the formed bale. What is important in this case is that, if the bale has already been provided with a top and bottom sheet, this top and bottom sheet are securely held in place by the wrapping material applied by the wrapping device.

The present invention also relates to a bale-pressing device configured to successively form bales, comprising a pressing station for compressing a bale and a wrapping device for wrapping the formed bale, in which the wrapping device is configured as described above.

In order to prevent the wrapping material with which a bale has been covered from coming off, in a preferred embodiment of the bale-pressing device according to the invention, a tying-up device is provided for tying up the wrapped bale using a tying-up material. The tying-up device is in particular configured to automatically tie up the wrapped bales. Said tying-up material is preferably wire-shaped or strap-shaped and is in particular made from iron, steel or plastic.

According to a particular embodiment of the bale-pressing device according to the invention, the pressing station comprises pressure means configured to keep the wrapping material temporarily pressed against the bale at the location of the end position of the wrapping unit. Said pressure means are configured as rotatable hooks which are provided in the top and bottom punch of the main press.

Another subject of the present invention relates to a method for forming and wrapping a bale in a bale-pressing device as described above, in which said method comprises the following steps:
   providing a bottom sheet of wrapping material in the pressing station for covering the bottom surface of a bale to be formed;
   providing a top sheet of wrapping material in the pressing station for covering the top surface of the formed bale;
   forming the bale in the pressing station;
   covering at least three of the upright surfaces of the bale by wrapping part of these surfaces by rotating the wrapping unit around the bale counterclockwise and by wrapping another part of said surfaces by rotating the wrapping unit around the bale clockwise.

According to a particular method according to the invention, the fourth (front) upright surface is wrapped as a result of the fact that a linearly movable carriage is configured to grip the wrapping material at the location of the dispensing position and to carry it along in the direction of the end position of the rotatable wrapping unit. Preferably, the movable carriage is furthermore configured to present, at the location of the end position, the wrapping material which has been carried along.

In order to further explain the properties of the present invention and to indicate additional advantages and particulars thereof, there now follows a more detailed description of the wrapping device according to the present invention and of the way in which a bale is wrapped by means of such a wrapping device. It will be clear that nothing in the following description can be interpreted as a limitation of the scope of protection of the present invention defined in the claims.

BRIEF DESCRIPTION OF THE DRAWINGS

In this description, reference numerals are used to refer to the attached drawings, in which.

DETAILED DESCRIPTION

Figure 1:
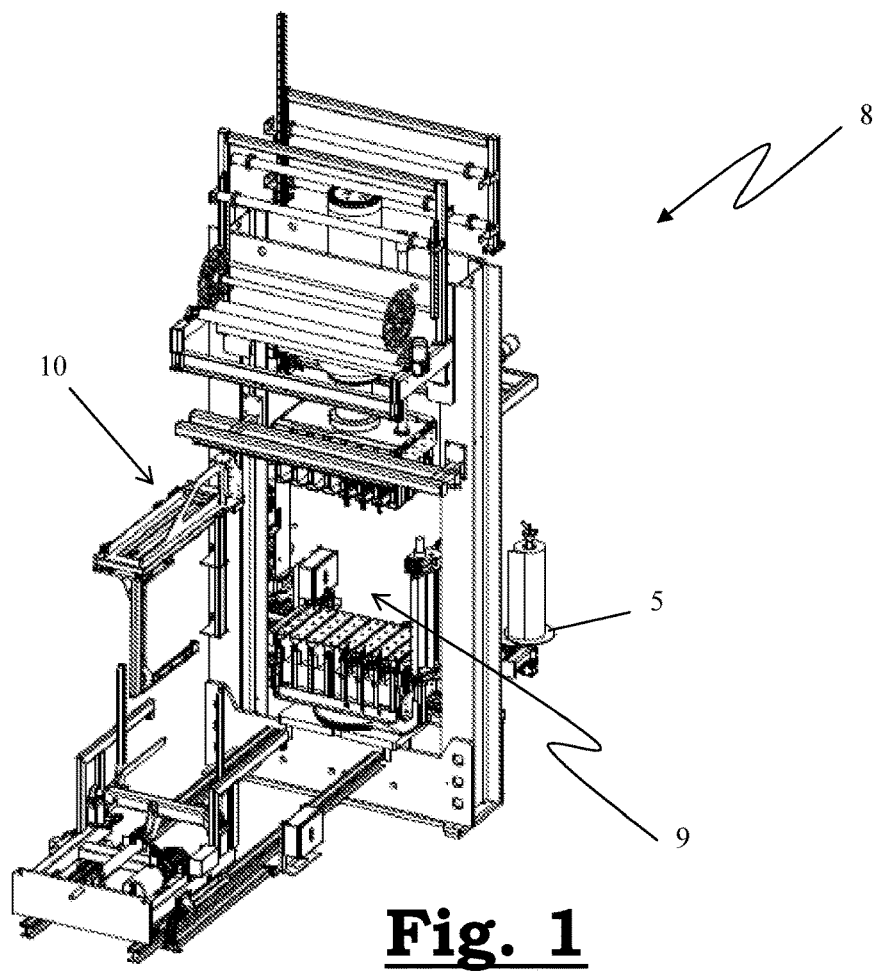
FIG. 1: shows a perspective view of a pressing station of a bale-pressing device provided with a wrapping device according to the invention.
Figure 2:
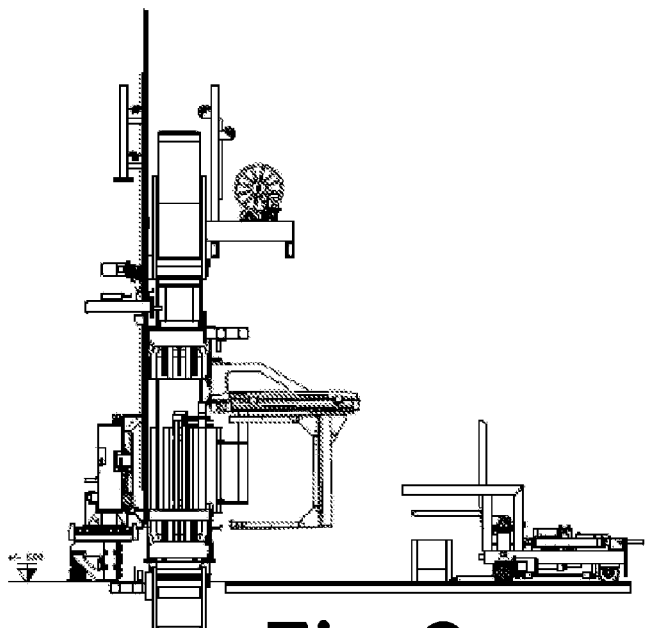
FIG. 2: shows a side view of the pressing station and wrapping device illustrated in FIG. 1.

The bale-pressing device (8) illustrated in FIGS. 1 and 2 comprises a pressing station (9) which is suitable for pressing a compressible material, such as e.g. natural and synthetic fibres, paper, cardboard, foam, plastic and the like, to form a bale (12). In order to protect the bale (12) and/or prevent loss of material, the different surfaces of the bale (12) will be provided with a wrapping material (2). The bottom and top surface of the bale are each covered by a sheet of wrapping material, a bottom and top sheet, respectively. To this end, the bale-pressing device (8) comprises a wrapping applicator which ensures that a piece of wrapping material (bottom and top sheet) is cut to a certain length and brought into position before a bale is formed in the pressing station.

Figure 3:
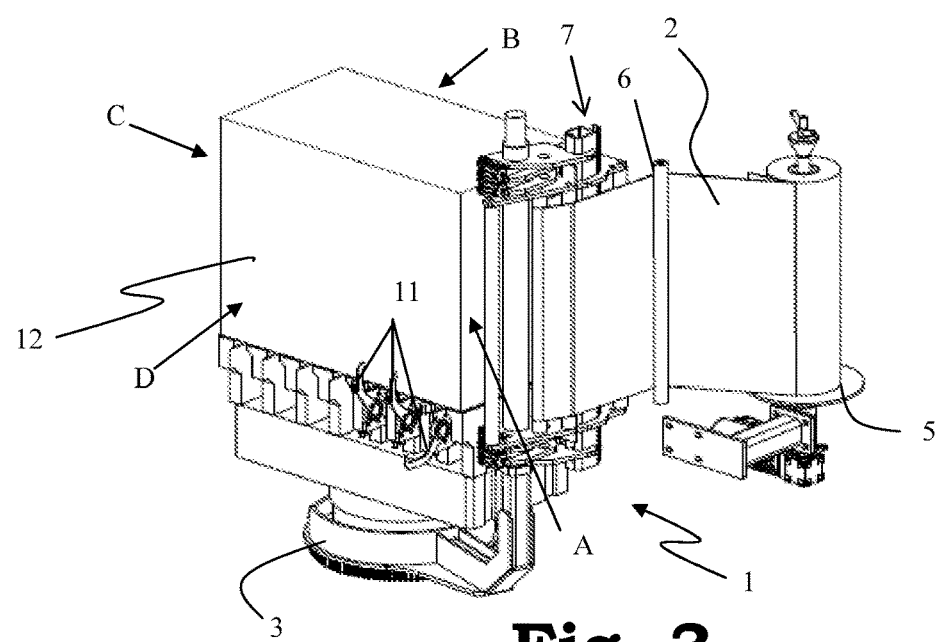
FIG. 3: shows a detail view of the rotatable wrapping unit and the drivable roll holder.

In order to cover the four upright surfaces (A, B, C and D) with a wrapping material (2), the patent proprietor has developed the wrapping device (1) illustrated in FIGS. 4 to 11. This device (1) is characterized by the fact that it comprises a wrapping unit (3) which is rotatable clockwise and counterclockwise (see FIG. 3) and is configured to wrap part of a bale (12) by rotating the wrapping unit (3) around the bale counterclockwise, and wrapping another part of a bale by rotating the wrapping unit (3) around the bale clockwise. The wrapping unit (3) will in principle cover three out of the four upright surfaces (in the illustrated embodiment, these are surfaces A, B and C) and a small part of the fourth upright surface (D) (and approximately 40% of the length of this surface) with wrapping material (2). In order to completely cover the fourth upright surface (D) with a wrapping material (2), the wrapping device (1) furthermore comprises a linearly movable carriage (4). This carriage (4) may comprise one or more gripper elements which are suitable for gripping a wrapping material (2). The wrapping unit (3) is also equipped with a cutting device (7) for cutting the wrapping material (2). The wrapping material (2) will be cut after the bale has been wrapped.

As will become clear from the further description, it is possible to wrap the upright surfaces (A, B, C, D) of a bale (12) using one strip of wrapping material using the wrapping device (1) according to the invention. Consequently, in contrast with the prior art and as was also explained earlier, no separate welding operation is required. This makes it possible to also use materials which are not weldable or not readily weldable to wrap bales, such as for example a woven polypropylene or tape fabric made from polypropylene. Obviously, it is still possible to wrap a bale using a weldable wrapping material, such as for example polyethylene.

Below, the way in which the four upright surfaces (A, B, C and D) of a resulting bale are wrapped using the wrapping device (1) according to the invention will be explained by means of FIGS. 4 to 11. However, it will be evident that alternative ways of wrapping, for example due to a different position of the various parts of the wrapping device and/or a modified direction of rotation of the rotatable wrapping unit (3), also fall within the scope of protection of the present invention.

Figure 4:
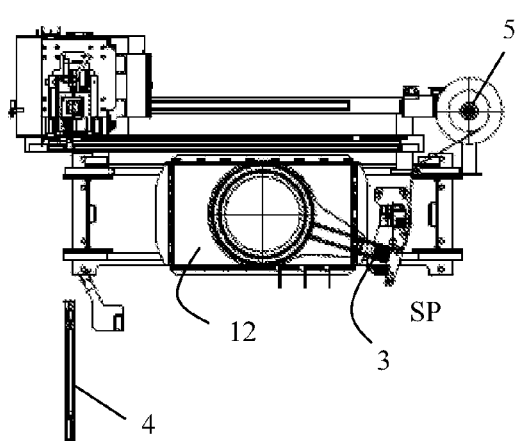
FIGS. 4 to 11: show the various method steps for wrapping the upright lateral surfaces of a bale by means of the wrapping device according to the invention.

When the bottom and top sheet have been applied, the rotatable wrapping unit (3) is in its starting position (SP) (see FIG. 4). The wrapping material (2) which will be used to wrap the upright surfaces (A, B, C and D) of the bale (12) is situated on a roll which is provided on a fixedly arranged roll holder (5). As the figures show, the roll holder (5) is arranged in a fixed position, next to the bale (12) to be packaged and at the location of the rear side of the bale.

Figure 5:
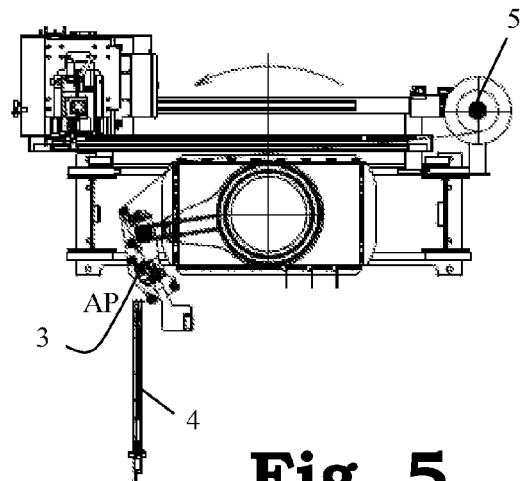

In a first step, the wrapping unit (3) will rotate counterclockwise from its starting position (SP) to a dispensing position (AP) (see the position of the wrapping unit in FIG. 5). During this rotating movement, the wrapping material (2) originating from the roll of wrapping material provided on the fixedly arranged roll holder (5), securely clamped by clamping elements, is provided on the wrapping unit (3), and the rear surface (denoted by reference numeral B in FIG. 3) and the (left-hand) lateral surface (C) of the bale (12) are covered with wrapping material (2). During rotation of the wrapping unit (3), the wrapping material is guided through the wrapping unit (3). To this end, the wrapping unit (3) comprises guide means in the form of guide rollers (6).

When the wrapping unit (3) reaches the dispensing position (AP), the wrapping material (2) is gripped by the gripper elements which are provided on the linearly movable carriage (4) and the clamping elements will release the wrapping material (2) (see FIG. 5). At that point in time, the linearly movable carriage (4) is situated on one side of the bale (12)

Figure 6:
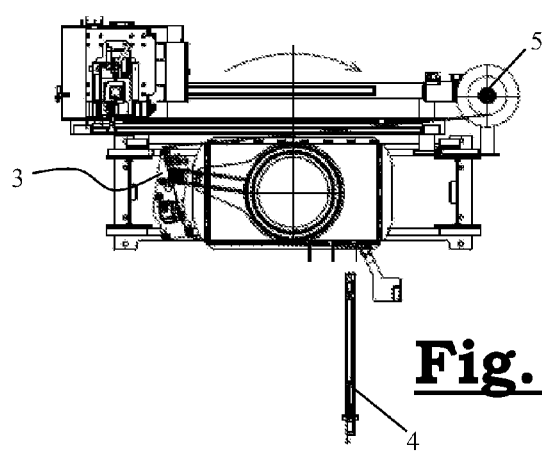

In a second step, the carriage (4) moves linearly in the direction of the other side of the bale in order thus to virtually completely cover the front surface (D) of the bale with a wrapping material (2) (see FIG. 6). At the same time, the wrapping unit (3) will rotate clockwise to an end position (EP). During this rotating movement of the wrapping unit (3), the clamping elements are open and the wrapping material moves through the wrapping unit (3). The linear carriage (4) will release the wrapping material (2) which was carried along at the location of the end position of the rotatable wrapping unit (3). Before the wrapping material (2) is released, the wrapping material is pressed against the bale on one side, preferably via pressure means (11) which, in principle, form part of the bale-pressing device. Subsequently, said carriage (4) will return to its original position in order to be ready to grip a new strip of wrapping material during wrapping of a subsequent bale.

Figure 7:
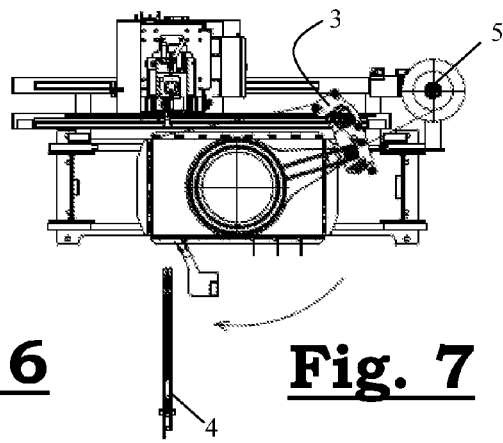
Figure 8:
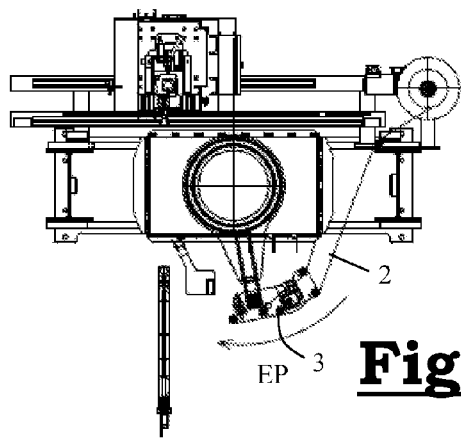
Figure 9:
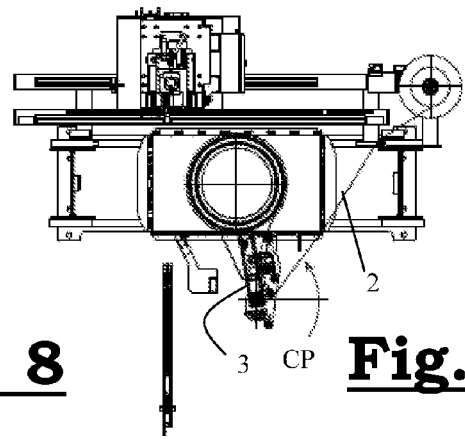
Figure 10:
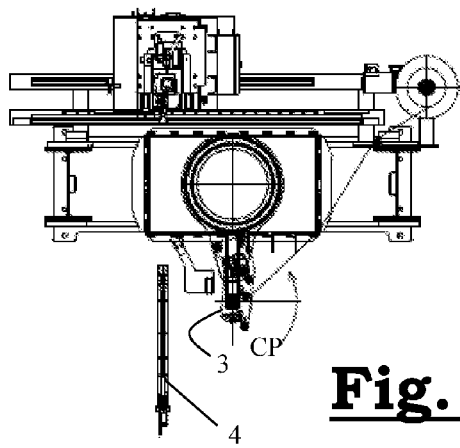

During its rotation between the dispensing position (AP) and the end position (EP), the wrapping unit (3) will pass the starting position (SP) (see FIG. 7). At the location of the starting position (SP), the wrapping unit (3) will carry the wrapping material along in the direction of the end position (EP) and, in this way, will cover the right-hand lateral surface (A) of the bale (12) with wrapping material (2) in a third step.

At the point in time when the wrapping unit (3) reaches its end position (EP) (see FIG. 8), the entire bale is covered, except for a small part of the front surface (A). This last part will be covered with wrapping material (3) in a fourth step by the wrapping unit (3) moving from its end position (EP) to a cutting position (CP) (see FIG. 9). Preferably, the wrapping unit (3) will move between the end and cutting position by means of a tilting movement about a vertical axis or by executing a linear movement. Due to the fact that the wrapping unit (3) performs a tilting or linear movement, the wrapping material is pressed tightly against the resulting bale. This has the significant advantage that, if the bale has already been provided with a top and a bottom sheet, said top and bottom sheets are securely kept in position by the wrapping material applied by the wrapping device (1).

Thereafter, the wrapping material (3) will be cut in the cutting position (CP) by means of the cutting device (7). After the wrapping material has been cut, the bale can still be tied up. To this end, the bale-pressing device (1) may be fitted with a tying-up device (10) for tying up the resulting bale using a tying-up material. The tying-up device will preferably tie up the resulting bale using a wire-shaped tying-up material, such as for example iron, steel or plastic wire, strip. In this case, it should be noted that the movable carriage (4) may also form part of a tying-up device which is configured to tie up the wrapped bale.

Figure 11:
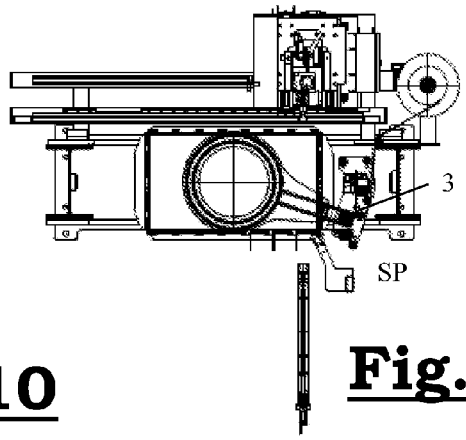

After the wrapping cycle has finished, the wrapping unit (3) will return to its starting position by rotating counter-clockwise (FIG. 11).

Using the wrapping device (1) according to the invention, it is possible to fit wrapping material tightly around a bale (12). On the one hand, this is due to the fact that the wrapping material keeps moving through the wrapping unit during the rotating movement of said wrapping unit, and on the other hand due to the fact that the roll holder (5) is drivable and is configured to keep the wrapping material tensioned during wrapping of the bale. Due to the fact that the material is continuously tensioned during rotation of the wrapping unit, and thus during wrapping of the bale, the wrapping material remains tightly wrapped around the bale once it has been fitted.

Using the wrapping device (1) according to the invention, it is possible both to wrap bales originating from presses in which the supplied material is pressed vertically into a chamber, after which the bale is released by removing the chamber or by pushing the bale out of the chamber in an efficient and simple way.

The invention claimed is:

1. Wrapping device (1) configured to wrap a bale with a wrapping material (2), comprising a wrapping unit (3) which is rotatable clockwise and counterclockwise, wherein the wrapping unit (3) is configured to wrap part of the bale by rotating the wrapping unit (3) counterclockwise around the bale and to wrap another part of the bale by rotating the wrapping unit (3) clockwise around the bale,
   wherein the rotatable wrapping unit (3) is rotatable counterclockwise at least between a starting position (SP) and a dispensing position (AP) and is rotatable clockwise between the dispensing position (AP) and an end position (EP),
   or
   wherein the rotatable wrapping unit (3) is rotatable clockwise at least between the starting position (SP) and the dispensing position (AP) and is rotatable counterclockwise between the dispensing position (AP) and the end position (EP),
   and
   wherein the wrapping device (1) further comprises a linearly movable carriage (4) configured to grip the wrapping material (2) at the location of the dispensing position (AP) and carry it along in the direction of the end position (EP) of the rotatable wrapping unit (3) in order to wrap part of the bale.

2. Wrapping device (1) according to claim 1, wherein the wrapping unit (3) comprises guide means which are configured to guide the wrapping material (2) through the wrapping unit (3) during rotation of the wrapping unit (3) around the bale.

3. Wrapping device (1) according to claim 2, wherein the guide means comprise one or more guide rollers (6) for guiding the wrapping material (2).

4. Wrapping device (1) according to claim 1, wherein the axis of rotation of the rotatable wrapping unit (3) coincides, during use, with the centre line of the bale to be wrapped.

5. Wrapping device (1) according to claim 1, wherein, at the location of its end position (EP), the rotatable wrapping unit (3) is movable between the end position (EP) and a cutting position (CP).

6. Wrapping device (1) according to claim 1, wherein the rotatable wrapping unit (3) comprises one or more clamping elements to carry the wrapping material (2) along during rotation of the wrapping unit (3) between the starting and dispensing position.

7. Wrapping device (1) according to claim 1, wherein the wrapping device (1) comprises a rotatable roll holder (5) configured to receive a roll of wrapping material, wherein said roll holder (5) is drivable and configured to keep the wrapping material (2) tensioned during wrapping of the bale.

8. Wrapping device (1) according claim 1, wherein the rotatable wrapping unit (3) comprises a cutting device (7) for cutting the wrapping material (2).

9. Wrapping device (1) according to claim 1, wherein the wrapping material (2) is polyethylene or tape fabric made from polypropylene or polyethylene.

10. Bale-pressing device (8) configured to successively form bales, comprising a pressing station (9) for compressing a bale and a wrapping device (1) for wrapping the formed bale, wherein the wrapping device (1) is configured according to claim 1.

11. Bale-pressing device (8) according to claim 10, wherein said device (8) comprises a tying-up device (10) which is configured to tie up the wrapped bale using a tying-up material.

12. Bale-pressing device (8) according to claim 10, wherein the pressing station (9) comprises pressure means (11) configured to keep the wrapping material (2) temporarily pressed against the bale at the location of the end position (EP) of the wrapping unit (3).

13. Method for forming and wrapping a bale in a bale-pressing device (8) according to claim 10, wherein the method comprises the following steps:
   providing a bottom sheet of wrapping material in the pressing station (9) for covering the bottom surface of a bale (12) to be formed;
   providing a top sheet of wrapping material in the pressing station for covering the top surface of the formed bale (12);
   forming the bale (12) in the pressing station (9);
   covering at least three of four upright surfaces (A, B, C, D) of the bale (12) by wrapping part of these surfaces by rotating the wrapping unit around the bale counterclockwise and by wrapping another part of said surfaces by rotating the wrapping unit around the bale clockwise,
   wherein at least part of a fourth upright surface (D) is wrapped by movement of the linearly movable carriage (4) of the dispensing position (AP) in the direction of the end position (EP) of the rotatable wrapping unit (3).

* * * * *